US006699804B1

(12) United States Patent
Jacques et al.

(10) Patent No.: US 6,699,804 B1
(45) Date of Patent: Mar. 2, 2004

(54) METHOD FOR MAKING A MICACEOUS PRODUCT PREFERABLY IN THE FORM OF A MICA RIBBON AND RESULTING PRODUCT

(75) Inventors: Alain Jacques, Jambes (BE); Noël Mortier, Gent Zwijnaarde (BE)

(73) Assignee: Compagnie Royale Asturienne des Mines SociétéAnonyme, Brussels (BE)

( * ) Notice: Subject to any disclaimer, the term of this patent is extended or adjusted under 35 U.S.C. 154(b) by 0 days.

(21) Appl. No.: 09/719,917

(22) PCT Filed: Jun. 17, 1999

(86) PCT No.: PCT/BE99/00077

§ 371 (c)(1),
(2), (4) Date: Feb. 20, 2001

(87) PCT Pub. No.: WO99/66515

PCT Pub. Date: Dec. 23, 1999

(30) Foreign Application Priority Data

Jun. 17, 1998 (EP) .......................................... 98870136

(51) Int. Cl.[7] ......................... B32B 27/04; B32B 27/12; B32B 5/02; B32B 27/38; B32B 11/00; B32B 17/02; B32B 21/10; B32B 19/06; B32B 5/16; B32B 7/12; B31B 1/60; B05D 5/10

(52) U.S. Cl. ....................... 442/149; 442/150; 442/175; 442/178; 442/180; 442/295; 442/296; 428/324; 428/355 EP; 428/363; 428/454; 156/60; 156/166; 427/208.6

(58) Field of Search ........................... 428/324, 355 EP, 428/363, 454; 442/149, 150, 175, 178, 180, 295, 296; 106/DIG. 3; 427/208.6; 156/60, 166, 325, 329, 330

(56) References Cited

U.S. PATENT DOCUMENTS

| | | | | | |
|---|---|---|---|---|---|
| 4,606,785 | A | * | 8/1986 | Zeise | 428/324 |
| 4,661,397 | A | * | 4/1987 | Kwiecinski et al. | 428/324 |
| 4,702,948 | A | * | 10/1987 | Sieber-Gadient | 428/354 |
| 4,769,276 | A | * | 9/1988 | Gruss et al. | 442/296 |
| 5,256,288 | A | * | 10/1993 | Lee | 210/321.61 |
| 5,540,969 | A | * | 7/1996 | Schuler | 428/324 |
| 5,787,602 | A | * | 8/1998 | Hsu et al. | 428/153 |
| 5,912,067 | A | * | 6/1999 | Stellini | 428/196 |

FOREIGN PATENT DOCUMENTS

| | | |
|---|---|---|
| DE | 2 151 753 | 4/1972 |
| EP | 0 735 071 A2 | 10/1996 |
| FR | 1 554 233 | 1/1969 |
| GB | 2 083 849 A | 3/1982 |

OTHER PUBLICATIONS

Derwent Publications, XP-002081799, AN 95-243706.
Patent Abstracts of Japan, vol. 095, No. 009, Applicant: Mitsubishi Electric Corp. Publication No. 07149928, publication date: Jun. 13, 1995.

* cited by examiner

*Primary Examiner*—Elizabeth M. Cole
*Assistant Examiner*—Jeremy R. Pierce
(74) *Attorney, Agent, or Firm*—Knobbe, Martens, Olson & Bear LLP

(57) ABSTRACT

The invention concerns a method for making a micaceous product capable of being impregnated preferably in the form of a mica ribbon by combining at least a support and a mica sheet. The invention is characterized in that it consists in: coating the support and the sheet with a solvent-fee resin or a mixture of solvent-free resins using several coating rollers brought to a temperature for producing the coat; combining the support with the mica sheet; subjecting them to a pressure and heat treatment.

23 Claims, 1 Drawing Sheet

METHOD FOR MAKING A MICACEOUS PRODUCT PREFERABLY IN THE FORM OF A MICA RIBBON AND RESULTING PRODUCT

This is the U.S. national phase under 35 U.S.C. §371 of International Application PCT/BE99/00077, filed Jun. 17, 1999.

SUBJECT OF THE INVENTION

The present invention relates to the preparation of a micaceous product preferably in the form of a mica tape comprising a support coated with a solvent-free resin, combined with a mica sheet.

More specifically, the present invention relates to a process for preparing a mica tape which is capable of being impregnated subsequent to the preparation process itself.

The present invention also relates to a novel micaceous product.

TECHNICAL BACKGROUND OF THE INVENTION

The electrical and optionally thermal insulation of copper components of electric engines, such as rods or coils, is achieved by taping up the said parts using micaceous products, more specifically micaceous tapes.

These micaceous tapes are in the form of a support impregnated with a resin, for example an epoxy resin, combined with a mica sheet. This mica sheet may be mica paper, optionally reinforced with a small amount of resin, for example epoxy resin.

Two main families of these tapes exist.

The first family comprises tapes known as "saturated tapes" or "prepregs", which are tapes manufactured from mica paper that is highly impregnated with a resin of Novolac type and having a glass fabric as support. The resin content is usually between 30% and 40% relative to the total weight of the tape.

During manufacture, the epoxy resin is brought to stage B, i.e. it has already undergone curing. Next, this type of product may be taped around the part to be insulated and will then undergo a heat treatment of about from 160° C. to 180° C.

Document JP-07 149 928 discloses a product in the form of a saturated mica tape manufactured conventionally. It appears that a solvent-free epoxy resin is then used in the second phase of the manufacture, i.e. after taping the tape around the machine, in order to obtain adequate electrical insulation.

Document EP-A-0 735 071 discloses a solvent-free resin composition optionally intended for manufacturing a micaceous tape of saturated type, i.e. a tape which is already totally impregnated and consequently has a relatively high resin content.

Document GB-A-2 083 849 discloses a process for preparing insulating tapes, which consists in impregnating a mica support at room temperature using a solvent-free resin, followed by attachment to a support and heating of the assembly so as to reduce the viscosity of the resin, which will promote the deep impregnation of the mica paper. A tape of "prepreg" type which is hence already highly impregnated will thus again be obtained.

The second family comprises so-called "porous" tapes, which have a relatively low resin content of between about 4% and 10% relative to the total weight of the tape. These tapes are capable of being impregnated subsequent to the process for manufacturing the said tapes and will be subjected, after taping up, to a "VPI (vacuum pressure impregnation)" treatment, which makes it possible in a second phase to carry out an impregnation with a resin which is usually solvent-free. The "VPI" treatment consists in immersing in the impregnation resin the copper parts taped up with the porous mica tape, while applying vacuum in order to remove any infiltrated air; next, the vacuum is broken and a certain pressure is applied for several hours in order to make the post-impregnation resin penetrate into the mica insulant. The prosecution of the entire post-impregnation process and the temperature of the resin are set by the nature of this resin, the thickness of the insulation to be impregnated and the porosity of the mica tape used.

Before taping up, very flexible, non-adhesive dry tapes are obtained, which are distinguished by truly exceptional absorption capacity. They are consequently used for high-voltage machines (of: up to 1000 MVA).

To prepare such tapes of the second family which are considered as capable of being impregnated, the "spraying" technique is known, which consists in spreading and impregnating a mica paper with an epoxy resin in solvent medium and then combining it with a support.

To prepare tapes capable of being impregnated, it is also known practice to use techniques of dusting a solid resin either on a mica sheet or directly onto the support, and then to attach the two components under pressure and heat. In particular, the publication EP-A-0 194 974 discloses a process for preparing thin mica tapes capable of being impregnated and comprising an incorporated accelerator, characterized in that a thin mica sheet is dusted with a powdered varnish free of hardener, next either the side of the thin mica sheet dusted with the varnish is bonded under pressure or heat with a glass fabric or a felt serving as support, or a glass fabric is impregnated with a liquid accelerator or a solution of a liquid or solid accelerator in a low-boiling solvent and the support thus obtained is bonded under pressure and heat with one side of the mica sheet dusted with varnish, and the laminate obtained is then impregnated with a liquid accelerator or a solution of a liquid or solid accelerator in a low-boiling solvent. Another possibility consists in impregnating a mica sheet with a liquid accelerator or a solution of a liquid or solid accelerator in a low-boiling solvent, in next dusting the impregnated mica sheet with a powdered varnish free of hardener, and then either in impregnating a glass fabric with a liquid accelerator or solution of a liquid or solid accelerator in a low-boiling solvent and bonding the support thus obtained under heat and pressure with the side of the thin mica sheet which has been dusted with powdered varnish, or in bonding the felt serving as support under pressure and heat with the side of the thin mica sheet which has been dusted with powdered varnish. However, it is observed that by using this process, the dusting operation with a varnish requires the use of a certain amount of varnish. In particular, the varnish will have a tendency, when it has been dusted onto the support, to pass through the mesh and be found on both faces of the support.

AIMS OF THE INVENTION

The present invention aims to provide a process for manufacturing micaceous products capable of; being impregnated, which requires the use of a low content of resin.

The present invention aims to provide a technique for avoiding the use of solvents for the preparation of micaceous products capable of being impregnated, such as mica tapes of porous type.

The present invention aims also to allow the preparation of such tapes which have increased flexibility while at the same time having sufficient or even increased adhesion properties.

In addition, the present invention aims to provide in the specific case of preparing roiled-up tapes, a process which avoids the problem of bonding between successive turns.

MAIN CHARACTERISTIC ELEMENTS OF THE INVENTION

The present invention relates firstly to a process for preparing a micaceous product capable of being impregnated, which is preferably in the form of a mica tape obtained by combining a support and a mica sheet, characterized in that:

- the support or the mica sheet is coated with a resin or an adhesive or alternatively a mixture of solvent-free resins, with the aid of coating cylinders at a working temperature for the coating operation,
- the support is combined with the mica sheet, and they are subjected to a pressure and temperature treatment at a second working temperature.

The expression "working temperature of the coating operation" should be understood as meaning the temperature to which the mixture of solvent-free resin is brought in order to be able to coat the support or the mica sheet. This temperature is usually between 40° C. and 200° C. This means that the resin should be in a non-solid form, i.e. in the more or less viscous or liquid form.

The expression "a pressure and temperature treatment" means a treatment at a temperature of between 40° C. and 200° C. for a pressure of between 0 and 20 bar in order to allow attachment of the support to the mica sheet.

Among the possible examples of resin intended for coating which may be mentioned are solvent-free epoxy resins, solvent-free silicone adhesives or any other solvent-free resin which is of adequate viscosity at the working temperatures of the coating operation.

The support may be either a film or a fabric, or even a felt. The mica sheet is preferably a conventional mica paper manufactured according to the usual papermaking techniques. This mica paper may be a 100% mica paper or optionally a mica paper which has been reinforced beforehand with an impregnation resin, for example an epoxy resin, by, a conventional implementation process such as impregnation by coating optionally in solvent medium.

It may be envisaged to incorporate an accelerator either with the resin used for the Coating or during a prior step during the preparation of the mica sheet into the so-called impregnation resin, or alternatively directly onto the support or onto the mica sheet itself.

In the first embodiments, the accelerator is mixed directly with the resin.

In general, it may be envisaged to use an accelerator which is in the form of a nitrogen compound such as an amine or an organometallic compound such as zinc naphthanate, or any other compound having the desired catalytic effect.

A second object of the present invention relates to a micaceous product capable of being impregnated, which is preferably in the form of a so-called porous mica tape and which comprises, on the one hand, a support impregnated by solvent-free coating with a resin and a mica sheet, or alternatively a mica sheet impregnated by solvent-free coating with a resin and the support itself, these two components: being attached to each other.

It is observed that when the support is a fabric, there will be deposits of resin essentially on the intersections of the yarns of the weft with those of the warp. More specifically, traces of resin will be observed exclusively at the intersections where the weft yarn superimposes the warp yarn. This makes it possible to obtain, in a particularly advantageous manner, very precise control of the resin content on the finished tape, this resin content being very much lower than that for the products obtained by the processes of the prior art (spraying or use of a solid powder). This also makes it possible to maintain or even enhance the flexibility properties and to limit the risks of bonding between turns when the tape is rolled up.

The fabric will preferably be a fabric or a silk made of woven glass fibres, having a weight per unit area of from 20 $g/m^2$ to 50 $g/m^2$. The mica sheet, and preferably the mica paper, has a weight per unit area of between 100 $g/m^2$ and 250 $g/m^2$.

DESCRIPTION OF SEVERAL PREFERRED EMBODIMENTS OF THE INVENTION

Figure 1:
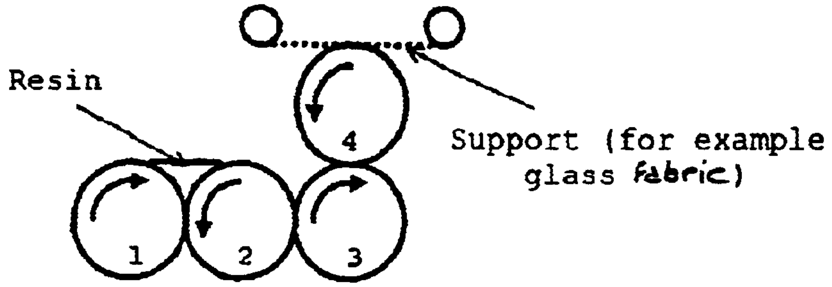
FIG. 1 represents a schematic view of the device designed to carry out the coating process according to the present invention.

FIG. 1 represents a schematic view of a device designed to carry out the process according to the invention. This device firstly comprises a coating station consisting essentially of several successive rollers, and preferably four rollers (1, 2, 3 and 4), which allow the coating of the support with a very small amount of resin.

Figure 2:
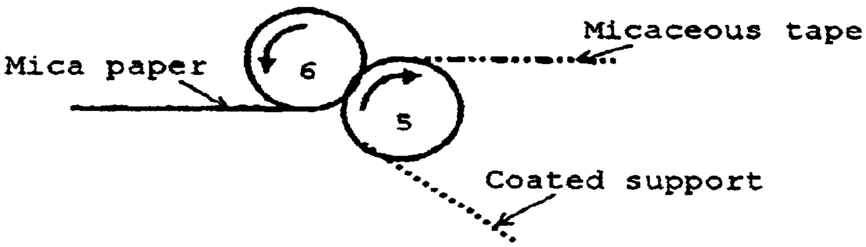
FIG. 2 represents a schematic view of the second step of the process for preparing a micaceous tape according to the present invention, which consists in attaching the support to the mica paper.

This coating unit is followed by a lamination unit which brings the two components, that is to say the mica sheet and the support, in contact and which exerts on the assembly a pressure and temperature action as described in FIG. 2. This pressure action is achieved using two rollers (5 and 6). Preferably, only one of the two rollers will be heated.

The examples which follow describe more specifically two embodiments of the process according to the present invention.

EXAMPLES

Example 1

A mica tape is prepared by hot-coating a glass fabric support using a solvent-free resin and the coated support is laminated onto a mica paper. The following materials are used to do this:

1) An unmodified epoxy resin based on bisphenol A and epichlorohydrin. This is a solvent-free resin which is solid at room temperature. This resin has an epoxy-equivalent weight of between 350 and 400 g/equiv. and a viscosity at 90° C. of about 4000 mPa.s.
2) A glass fabric with a weight per unit area of 24 $g/m^2$ consisting of 26 warp yarns/cm and 15 weft yarns/cm, the yarn count being 5.5 tex in warp and in weft.

3) A mica paper of muscovite type with a weight per unit area of 160 g/$m^2$ which is reinforced beforehand with 4 g/$m^2$ of epoxy resin containing an accelerator of metal salt type. The addition of the epoxy resin and the accelerator to the mica paper is carried out conventionally, i.e. by impregnation in solvent medium.

The process is performed as follows to prepare the mica tape:

A) The epoxy resin is preheated in an oven to 90°0 C. When the resin has reached this temperature and is sufficiently fluid, an adequate amount is poured between the rollers 1 and 2 of the coating station described in FIG. 1. The rollers 1 and 3 of the coating station have been preheated to 90° C and are maintained at this temperature throughout the coating operation. The rotation speeds and the gap between the various rollers of the coating stand are adjusted so as to transfer a thin layer of resin from roller 2 to roller 3 and from roller 3 to roller 4.

B) The glass fabric is rolled out and brought into tangential contact with the roller 4 of the coating stand as described in FIG. 1. The glass fabric carries along some of the resin which is on the roller 4.

C) Separately, the mica paper is -rolled out and placed in contact, in the laminating unit described in FIG. 2, with the coated glass fabric. The roller 5 has been preheated to 80° C. A pressure of 20 bar is applied by roller 6 on roller 5 so as to attach the mica paper to the support in order to obtain a micaceous tape.

D) The micaceous tape thus obtained is rolled up.

With the settings used in the example, a deposit of about 4 to 5 g/$m^2$ of epoxy resin is obtained on the glass fabric, which is equivalent to a content of about 2% relative to the total weight of the tape. If the resin used beforehand in the mica paper is taken into account, a finished tape with a resin content of between 3.5% and 4% relative to the total weight of the tape will be obtained.

Figure 3:
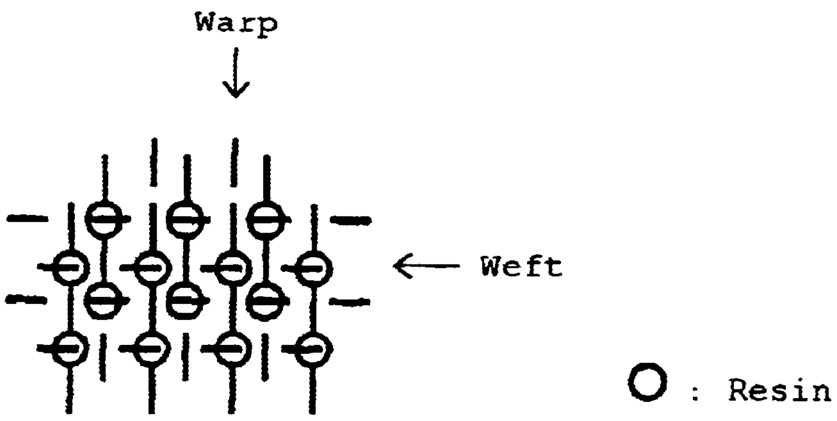
FIG. 3 represents a schematic description of a glass fabric impregnated by the technique described.

When a sample of the coated glass fabric as described above is examined with binoculars or a microscope, resin is found to be present only at the intersections between the warp yarns and the weft yarns and more specifically only at the intersections where the weft yarns superimpose the warp yarns, that is to say at one intersection out of 2 as described in FIG. 3. It is also found that there is no transfer of resin onto the other face of the glass fabric.

The characteristics of a mica tape thus prepared (tape A) are summarized in Table I and compared with those of a tape manufactured by the conventional spraying technique in solvent medium (tape B). It is found that tape A manufactured according to the process described above has a resin content which is lower than the level normally required for a tape B manufactured by the conventional spraying technique in solvent medium. Furthermore, tape A is more flexible and has greater porosity and better tensile strength than tape B. Tape A is also totally dry on the outer face of the glass fabric, given that the resin is located only at the interface between the glass fabric and the mica paper; this characteristic limits the risks of bonding between turns of the rolled-up tape.

Example 2

A mica tape is prepared by hot-coating according to the same technique as described in Example 1. The following materials are used to do this:

1) An unmodified epoxy resin based on bisphenol A and epichlorohydrin. This is a solvent-free liquid resin which has a high viscosity at room temperature. This resin has an epoxy-equivalent weight of between 235 and 265 g/equiv. and a viscosity at 90° C. of about 300 mPa.s.

2) A polyester film 23 $\mu$m thick.

3) A mica paper of muscovite type with a weight per unit area of 180 g/$m^2$, reinforced beforehand with 5 g/$m^2$ of epoxy resin by impregnation in solvent medium.

To prepare the mica tape, the process is performed in the same way as in Example 1, replacing the glass fabric with the polyester film.

With the settings used in the example, a deposit of about 4 g/$m^2$ of epoxy resin is obtained on the polyester film. The mica tape thus prepared is extremely flexible and the adhesion between the polyester film and the mica paper is very good.

TABLE I

| Characteristics | Unit | Tape A | Tape B |
|---|---|---|---|
| Weight | g/$m^2$ | 189.5 | 198 |
| Content of binder by loss of ignition | g/$m^2$ | 9.7 | 14.8 |
| Thickness | mm | 0.13 | 0.13 |
| CEI flexibility | N/m | 24 | 30 |
| Porosity on the mica side | sec | 299 | 350 |
| Porosity of the support side | sec | 208 | 300 |
| Tensile strength | Kg/cm | 9.8 | 8.5 |
| Puncture at 70° C. | sec | 30 | 40 |

What is claimed is:

1. A micaceous product adapted for impregnation comprising:

a support coated with a solvent-free resin; and a mica sheet, wherein the resin content of said micaceous product is between 1% and 10% of the total product weight; and the support is a fabric comprising weft yarns and warp yarns on which the resin deposits appear exclusively on the weft yarns at the intersection with the warp yarns.

2. A micaceous product according to claim 1, wherein the resin content is between 4% and 10% relative to the total weight of the micaceous product.

3. The micaceous product according to claim 1, wherein the micaceous product is a mica tape.

4. A process for preparing a micaceous product of claim 1, said process comprising:

coating the support of said micaceous product with at least one solvent-free resin, with an aid of several coating rollers at a working temperature for a coating operation of between 40° C. and 200° C.;

combining the support with the mica sheet; and subjecting said support and said mica sheet to a pressure and temperature treatment; thereby preparing said micaceous product.

5. The process according to claim 4, wherein the working temperature for the coating operation is adjusted so as to obtain a micaceous product with a resin content of between 1% and 10% relative to the total weight of said micaceous product.

6. The process according to claim 5, wherein the resin content of the micaceous product is between 4% and 8% relative to the total weight of said micaceous product.

7. The process according to claim 4, wherein the pressure and temperature treatment is performed at a temperature between 40° C. and 200° C. and a pressure between 0 and 20 bar.

8. The process according to claim 4, wherein a small amount of impregnation resin is incorporated into the mica sheet, prior to the coating operation.

9. The process according to claim 8, wherein the impregnation resin is in a solvent medium.

10. The process according to claim 4, wherein the resin for the coating operation has a melting point that is lower than the working temperature.

11. The process according to claim 4, wherein the resin is a solvent-free resin.

12. The process according to claim 11, wherein the resin is a solvent-free resin of the type selected from the group consisting of a silicone type and an epoxy type.

13. The process according to claim 11, wherein the solvent-free resin is made of a material that belongs to the family of DGEBA resins.

14. The process according to claim 4, wherein an accelerator is incorporated into the coating resin.

15. The process according to claim 14, wherein the accelerator is a compound selected from the group consisting of a nitrogen compound and an organometallic compound.

16. The process according to claim 4, wherein an accelerator is incorporated into the mica sheet.

17. The process according to claim 16, wherein the accelerator is a compound selected from the group consisting of a nitrogen compound and an organometallic compound.

18. The process according to claim 4, wherein an accelerator is incorporated into the support.

19. The process according to claim 18, wherein the accelerator is a compound selected from the group consisting of a nitrogen compound and an organometallic compound.

20. The process according to claim 4, wherein the mica sheet is a mica paper.

21. The process according to claim 4, wherein the mica sheet is prepared from from a material selected from the group consisting of muscovite, phlogopite, vermiculite, synthetic mica, and a combination thereof.

22. The process according to claim 21, wherein the mica sheet is prepared from muscovite that has been calcined.

23. The process according to claim 4, wherein the micaceous product is a mica tape.

* * * * *